United States Patent [19]

Matsumoto et al.

[11] Patent Number: 4,460,820

[45] Date of Patent: Jul. 17, 1984

[54] APPARATUS FOR HEATING HEAT-SHRINKABLE TUBES

[75] Inventors: Michito Matsumoto, Ibaraki; Toshiaki Kakii; Yuichi Toda, both of Kanagawa, all of Japan

[73] Assignees: Nippon Telegraph & Telephone Public Corporation, Tokyo; Sumitomo Electric Industries, Ltd., Osaka, both of Japan

[21] Appl. No.: 400,531

[22] Filed: Jul. 21, 1982

[30] Foreign Application Priority Data

Jul. 22, 1981 [JP] Japan ................................ 56-113608
Jul. 24, 1981 [JP] Japan ................................ 56-116857

[51] Int. Cl.³ ............................................. G02B 5/14
[52] U.S. Cl. .......................... 219/385; 174/DIG. 8; 219/521; 219/535; 219/354; 350/96.21; 264/230
[58] Field of Search ............... 219/385, 521, 535, 354, 219/342, 358; 264/230, 1.5; 350/96.2, 96.21; 174/DIG. 8

[56] References Cited

U.S. PATENT DOCUMENTS

| 3,159,513 | 12/1964 | Baier ........................... 174/DIG. 8 |
| 3,470,046 | 9/1969 | Verdin ......................... 174/DIG. 8 |
| 3,475,592 | 10/1969 | Berkl ............................... 219/388 |
| 3,515,853 | 6/1970 | McAdams ....................... 219/358 |
| 3,810,802 | 5/1974 | Buhite ............................ 350/96.21 |
| 4,023,886 | 5/1977 | Nakayama ...................... 350/96.21 |
| 4,078,910 | 3/1978 | Dalgoutte ...................... 350/96.21 |
| 4,092,382 | 5/1978 | Heckman ......................... 264/230 |
| 4,129,932 | 12/1978 | Stancati .......................... 264/230 |
| 4,261,644 | 4/1981 | Giannaris ...................... 350/96.21 |

FOREIGN PATENT DOCUMENTS 2456555 8/1976 Fed. Rep. of Germany ... 350/96.21

Primary Examiner—C. L. Albritton
Assistant Examiner—Teresa J. Walberg
Attorney, Agent, or Firm—Sughrue, Mion, Zinn, Macpeak and Seas

[57] ABSTRACT

An apparatus for heating a heat-shrinkable tube has a base for supporting the heat-shrinkable tube and a plurality of heating units provided on the base. The heating units are independently operable and are disposed in the longitudinal direction of the heat-shrinkable tube.

5 Claims, 8 Drawing Figures

APPARATUS FOR HEATING HEAT-SHRINKABLE TUBES

BACKGROUND OF THE INVENTION

1. Field of the Invention

The present invention relates to an apparatus and method for heating heat-shrinkable tubes.

2. Description of the Prior Art

In splicing coated optical fibers 1 and 1' which have a thin coating on their outer surfaces, the thin coating is removed from the ends of each of the coated optical fibers 1 and 1', as illustrated in FIG. 1. The ends of the thus exposed optical fibers 3 and 3' are then spliced at a point 4. The resulting spliced portion is inserted into a heat-shrinkable tube 2' (indicated by dotted lines in FIG. 1) which is made of polyethylene, polypropylene, or the like. The inner diameter of the heat-shrinkable tube 2' is larger than the outer diameter of the spliced portion. When the heat-shrinkable tube 2' is heated, it shrinks and closely covers the end portion of each of the coated optical fibers 1 and 1' and the spliced portion of the optical fibers. The resulting shrunken tube 2 is indicated by solid lines in FIG. 1, and this tube 2 functions to reinforce the spliced portion of the optical fibers and protect it from external damage.

This method for splicing coated optical fibers is widely used. In this method, the central portion of the heat-shrinkable tube 2' is first heat-shrunken and, thereafter, the remaining side portions are heat-shrunken. The reason for this is that, if the side portions are first heat-shrunken, air remains in the interior of the heat-shrinkable tube. Thereafter, when the central portion is heat-shrunken, the air cannot be expelled from the inside of the tube and remains in a bubble form, thus reducing the reinforcement effect of the spliced portion.

Heretofore, when heating such heat-shrinkable tubes according to the above-described method, a heating apparatus, as shown in FIGS. 2 and 3, has been used. The heating apparatus comprises a base 5 and a grooved supporting member 6 which has a U-shaped cross section in which a nichrome heater 7 is provided at both side walls and at the bottom of a groove G. The coated optical fibers 1, 1', with the heat-shrinkable tube 2' covering their spliced portion is placed at a position 8, and the heat-shrinkable tube is shrunken by heating. This heating apparatus, however, gives rise to the problem that both end portions of the heat-shrinkable tube may be heat-shrunken before the central portion is shrunk because heating is applied uniformly in the longitudinal direction of the tube. Therefore, an operator must heat the heat-shrinkable tube while reciprocatingly moving the coated optical fiber along its longitudinal direction so that the central portion of the tube is shrunken first and, thereafter, the remaining side portions are shrunken. Thus, the operator is required to control the quantity and speed of reciprocating movement precisely while observing the condition in which the heat-shrinkage proceeds. The conventional heating apparatus, therefore, requires a great deal of operator skill if the heat-shrinkage is to be performed satisfactorily. In addition, this heating method is troublesome and requires a long period of time because the heat-shrinkable tubes must each be heated carefully. Also, the results of this method are often unpredictable and inconsistent, and, therefore, reliability is poor.

SUMMARY OF THE INVENTION

The present invention is intended to overcome the above-described disadvantages. According to one embodiment of the present invention, an apparatus for heating a heat-shrinkable tube comprises a supporting unit for a heat-shrinkable tube and a plurality of heating units which are disposed in the longitudinal direction of the heat-shrinkable tube. These heating units can be operated independently.

The present invention also includes a method for heating a heat-shrinkable tube in which any one of a plurality of independently operable heating units which are disposed in the longitudinal direction of the heat-shrinkable tube are first heated. Thereafter, the remaining heating units are heated successively at predetermined time intervals in both directions of the heating unit first heated or in only one direction of the heating unit first heated.

According to another embodiment of the present invention, a heating apparatus is designed so that the length of the heating zone varies and is smallest at an inlet top portion of the apparatus and largest at a bottom portion of the apparatus. Therefore, by moving the heat-shrinkable tube from the inlet portion of the heating apparatus in a direction perependicular to the longitudinal direction of the heat-shrinkable tube, the heat-shrinkable tube shrinks from the central portion of the tube. Accordingly, the heat-shrinkable tube is shrunken by moving it in a direction which is perpendicular to the longitudinal direction of the linear member.

DESCRIPTION OF THE PREFERRED EMBODIMENTS

Figure 1:
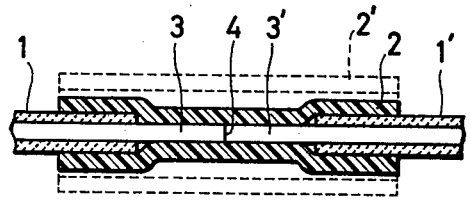
FIG. 1 is a cross-sectional view of a spliced portion of coated optical fibers.
Figure 2:
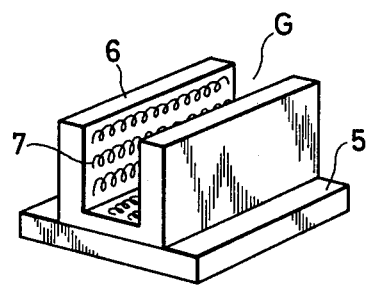
FIG. 2 is a perspective view of a conventional heating apparatus.
Figure 3:
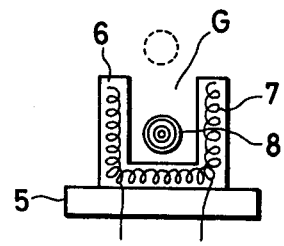
FIG. 3 is a front view of the apparatus of FIG. 2.
Figure 4:
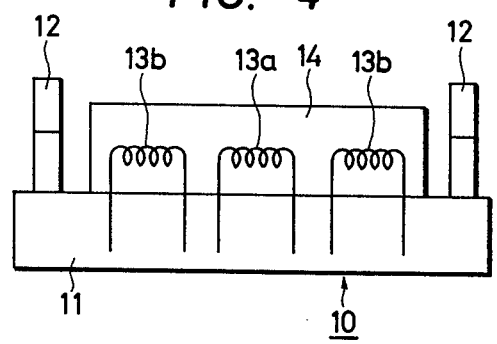
FIG. 4 is a schematic view of a heating apparatus according to a first embodiment of the invention.
Figure 5:
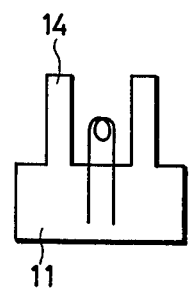
FIG. 5 is a side view of the heating apparatus of FIG. 4.

Referring to FIGS. 4 and 5, a heating apparatus 10 of the invention has a long and narrow base 11. Supporting units 12—12 are located at opposite ends of the base 11, and the heat-shrinkable tube is mounted on the supporting units. Between the supporting units 12—12, a plurality of heating units 13a, 13b are disposed along the longitudinal direction of the base 11 so that a predetermined space is maintained between the heat-shrinkable tube 17 and the heating units 13a, 13b. The heating units may be electrical heaters, and FIG. 4 shows an embodiment of the invention in which three heating units 13a, 13b are provided. Furthermore, shielding plates are provided at both sides of the heating units 13a, 13b, and these shielding plates are located in the longitudinal direction of the heat-shrinkable tube 17.

Figure 6:
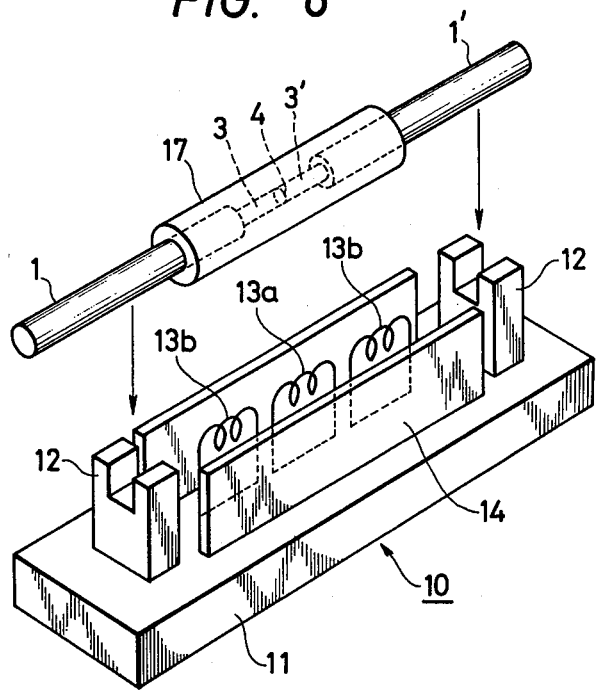
FIG. 6 is a schematic view illustrating the use of the heating apparatus of FIGS. 4 and 5.

Referring to FIG. 6, a portion of point 4 at which optical fibers 3, 3, of optical fibers 1, 1' are connected to each other is first fitted into the heat-shrinkable tube 17.

Thereafter, the spliced optical fibers are mounted on the supporting units 12 of the heating apparatus 10 so that the heat-shrinkable tube 17 is disposed above the heating units 13a, 13b. Of the heating units 13a, 13b, the central heating unit 13a, is heated to a predetermined temperature to shrink the central portion of the heat-shrinkable tube 17. In this step, heating temperature, heating time, and so forth are determined by the type of material comprising the heat-shrinkable tube 17, the heat-resistance of the optical fibers 1, 1', the distance between the heat-shrinkable tube 17 and the heating units 13a, 13b, etc.

After the central portion of the heat-shrinkable tube 17 is shrunken by heating the central heating unit 13a for a predetermined period of time, the heating units 13b, which are positioned at both sides of the central heating unit 13a, are heated to a predetermined temperature to shrink the remaining portions of the heat-shrinkable tube 17.

The method and apparatus of the invention is not limited to the above-described embodiment in which heat-shrinkage is conducted from the central portion to both end portions. According to another embodiment of the invention, any one of the heating units 13b can be heated first to heat-shrink a side portion of the heat-shrinkable tube 17 which is positioned above the heated heating unit 13b. Thereafter, the adjacent central heating unit or units can be heated to initiate heat-shrinkage from the side portion to the end portions of the heat-shrinkable tube 17. Thereafter, further adjacent heating units may be heated in order to complete the heat-shrinkage process.

The present invention will be explained in more detail with reference to the following example:

(1) Heating Unit: Electric heater (50V, 50W).
(2) Arrangement of Heating Units: Three heating units having a width of 20 mm are provided at 2.5 mm intervals.
(3) Type of Material of Heat-Shrinkable Tube: Irradiated polyethylene.
(4) Diameter of Heat-Shrinkable Tube: 5 mm.
(5) Distance between Heat-Shrinkable Tube and Heating Unit: about 0 mm.

When the temperature in the vicinity of the heat-shrinkable tube was raised to about 120° C. by heating the central heating unit for 12 seconds, the central portion of the heat shrinkable tube began to shrink at a temperature of about 75° C. After heating the central heating unit, the ramining heating units, which are located at both sides of the central heating unit, were heated for about 12 seconds. Heat-shrinkage thus extended from the central portion to both side portions of the heat-shrinkable tube. Finally, the heat-shrinkable tube was shrunken so that it was in close contact with the surface of the optical fibers and the spliced fibers, thereby producing a good protective boundary for the fibers.

In any of the above-described embodiments using the heating apparatus of the present invention, heat-shrinkage of the heat-shrinkable tube is achieved while expelling air from the inside of the tube. Therefore, no air remains in the inside of the heat-shrunken tube resulting in the formation of a protective layer which has a high mechanical strength. Furthermore, since such heat-shrinkage can be performed mechanically without moving the heat-shrinkable tube, it can be achieved more accurately than with the conventional method, and, moreover, the heat-shrinking procedure can be simplified. Thus, the use of the heating apparatus of the present invention makes the operation easy and increases its reliability.

The heating apparatus and heating method of the present invention are applicable not only to single structure heat-shrinkable tubes as described above, it is applicable also to heat-shrinkable tubes which have a reinforcing adhesive or a heat medium such as a steel wire in the inside of the tube. In the case of heat-shrinkable tubes which use a steel wire as a heat medium, heating temperature, heating time, and so forth are controlled appropriately.

Figure 7:
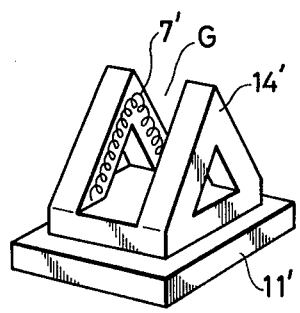
FIG. 7 is a perspective view of another embodiment of a heating apparatus of the invention.
Figure 8:
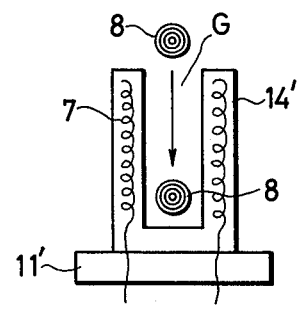
FIG. 8 is a front view of the apparatus of FIG. 7.

FIG. 7 is a perspective view of another embodiment of a heating apparatus of the present invention. A supporting member 14 which has a groove G is provided on a base 11'. As shown in FIG. 7, the side plates of the supporting member 14' are triangular, and a reversed V-shaped heating member 7' is provided on both inner side walls of the groove G. Since the heating member 7' is in the reversed V-shaped form, when the linear member is placed in the groove G, the heating width is narrow at the inlet of the groove G and extends toward the bottom. In this heating apparatus, when the spliced portion of the coated optical fibers with a heat-shrinkable tube disposed thereon is moved in the direction of the arrow in FIG. 8, the central portion of the tube is first heated and shrunken. Thereafter, as the wire is lowered, the heating portion moves to the outside so that the heat-shrunken portion of the tube gradually extends toward the ends of the wires so that the entire tube is heat-shrunken, thereby fully covering the spliced portion of the wire.

When using the heating apparatus described in the latter embodiment of the present invention, it is not necessary to move the heat-shrinkable tube in the longitudinal direction of the tube. It is sufficient simply to move the heat-shrinkable tube downward at a fixed speed which is determined by the shape of the apparatus. By moving the heat-shrinkable tube downward in this manner, a protective cover, which has no air bubbles inside it and which has good adhesive properties, is readily produced.

Although the side plate of the heating apparatus of FIG. 7 is shown as triangular in shape, any alternative design can be used which results in a heating member which is narrow at its inlet and wide at its bottom so that, when the heat-shrinkable tube is moved in a direction perpendicular to its longitudinal direction, the width of the heating zone gradually increases. Furthermore, the heating means can comprise nichrome heating members or any other similar type of heating member.

When the heating apparatus of the second embodiment of the present invention is used, as described above, a good cover using a heat-shrinkable tube can be obtained simply by moving the heat-shrinkable tube in a direction perpendicular to the longitudinal direction of the tube at a predetermined speed. Thus, the operation of the heating apparatus is easy, and good heat-shrinkage can be attained by those not skilled in the operation. Furthermore, by properly controlling the speed of movement of the heat-shrinkable tube, depending on the shape of the heating equipment, automatization can be attained easily and, therefore, this method results in an increase in working efficiency.

We claim:

1. An apparatus for heating a heat-shrinkable tube, comprising:

a heat shrinkable tube;
a base;
a plurality of independently operable heating units disposed along a longitudinal direction of said base, and
means for supporting said heat-shrinkable tube stationary and adjacent to said heating units when said units are selectively actuated.

2. The apparatus as claimed in claim 1 wherein said means for supporting comprises supporting units disposed at opposite ends of said base for supporting said heat-shrinkable tube.

3. The apparatus as claimed in claim 1 wherein said heating unit comprise electric heaters.

4. The apparatus as claimed in claim 1 further comprising shielding plates disposed along said longitudinal direction of said base and being disposed on opposite sides of said heat-shrinkable tube.

5. The apparatus as claimed in claim 1 wherein three of said heating units are provided.

* * * * *